United States Patent
Nagy et al.

(10) Patent No.: US 7,666,961 B2
(45) Date of Patent: Feb. 23, 2010

(54) OLEFIN POLYMERIZATION PROCESS

(75) Inventors: Sandor Nagy, Naperville, IL (US); Barbara M. Tsuie, Cincinnati, OH (US); Jean A. Merrick-Mack, West Chester, OH (US); Natalia Nagy, Naperville, IL (US)

(73) Assignee: Equistar Chemicals, LP, Houston, TX (US)

( * ) Notice: Subject to any disclaimer, the term of this patent is extended or adjusted under 35 U.S.C. 154(b) by 252 days.

(21) Appl. No.: 11/899,112

(22) Filed: Sep. 4, 2007

(65) Prior Publication Data
US 2009/0062489 A1 Mar. 5, 2009

(51) Int. Cl.
*C08F 4/72* (2006.01)
*C08F 4/64* (2006.01)

(52) U.S. Cl. ............... 526/172; 526/161; 526/160; 526/170; 526/348; 526/348.2; 526/348.5; 526/348.6; 526/352

(58) Field of Classification Search ............. 526/172, 526/161, 160, 170
See application file for complete search history.

(56) References Cited

U.S. PATENT DOCUMENTS

| | | | |
|---|---|---|---|
| 5,153,157 A | 10/1992 | Hlatky et al. | |
| 5,198,401 A | 3/1993 | Turner et al. | |
| 5,241,025 A | 8/1993 | Hlatky et al. | |
| 5,414,180 A | 5/1995 | Geerts et al. | |
| 5,648,440 A | 7/1997 | Sugano et al. | |
| 6,211,311 B1 | 4/2001 | Wang et al. | |
| 6,232,260 B1 | 5/2001 | Nagy et al. | |
| 6,451,724 B1 | 9/2002 | Nifant'ev et al. | |
| 6,559,251 B1 | 5/2003 | Wang et al. | |
| 6,908,972 B2 | 6/2005 | Tsuie et al. | |
| 7,196,147 B2 | 3/2007 | Wang et al. | |
| 2009/0061135 A1* | 3/2009 | Wang et al. | 428/36.8 |

OTHER PUBLICATIONS

Stadler, et al., "Influence of Type and Content of Various Comonomers on Long-Chain Branching of Ethene/α-Olefin Copolymers", *Macromolecules* 39 (2006) 1474-1482.

* cited by examiner

*Primary Examiner*—Ling-Siu Choi
*Assistant Examiner*—Rip A. Lee
(74) *Attorney, Agent, or Firm*—Joan Tyrell; Jonathan L. Schuchardt

(57) ABSTRACT

A slurry process for polymerizing ethylene is disclosed. The process comprises polymerizing ethylene in the presence of an α-olefin and a catalyst comprising an activator and a supported bridged bis-indeno[2,1-b]indolyl zirconium complex. The process uses a highly active catalyst and provides polyethylene characterized by a high level of long-chain branching.

10 Claims, No Drawings

OLEFIN POLYMERIZATION PROCESS

FIELD OF THE INVENTION

This invention relates to a slurry process for making ethylene copolymers. The process uses a highly active catalyst and provides polyethylene with a high level of long-chain branching.

BACKGROUND OF THE INVENTION

Many olefin polymerization catalysts are known, including conventional Ziegler-Natta catalysts. While these catalysts are inexpensive, they exhibit low activity and are generally poor at incorporating α-olefin comonomers. The large variety of active sites in Ziegler-Natta catalysts makes it difficult to control polymer architecture. To improve polymer properties, single-site catalysts, in particular metallocenes are beginning to replace Ziegler-Natta catalysts.

Slurry reactors are in widespread use for production of polyethylene homo- and copolymers. Slurry reactors include stirred-tank reactors and water-jacketed tubular reactors arranged in a series of continuous horizontal or vertical loops. A "slurry solvent" in which polyethylene has low solubility constitutes the continuous phase in such reactors. The slurry is intensely stirred in a continuous stirred-tank reactor or series of reactors or, in the case of slurry loop reactors, is driven around the loop at relatively high speed by one or more rather massive pumps. Ethylene, supported catalyst, comonomers, and processing additives are injected into the reactor where polymerization takes place, creating a slurry of polyethylene in solvent.

U.S. Pat. Nos. 6,232,260 and 6,451,724 disclose the use of transition metal catalysts based upon indenoindolyl ligands. Indenoindolyl catalysts are remarkably versatile because substituent effects and bridging changes can often be exploited to provide polymers with tailored physical or mechanical properties. Unbridged indenoindolyl complexes (as exemplified in the '260 patent) usually provide favorable activity although they sometimes fail to provide polymers having high enough molecular weights. Bridged indenoindolyl complexes (as taught, e.g., in U.S. Pat. No. 6,908,972) readily copolymerize α-olefins and provide polymers with varying levels of long-chain branching. Some of the examples are reported to have substantial long-chain branching. For instance, Example 18 of the '972 patent reports substantial long-chain branching using a supported complex of a dimethylsilyl-bridged indeno[2,1-b]indolyl cyclopentadienyl zirconium dichloride. (For the structure of this complex, see Comparative Example 3 of this application.) For a discussion of long-chain branching in polyethylene, see *Macromolecules* 39 (2006) 1474 and references cited therein.

Despite the considerable experience with single-site catalysts generally and indenoindolyl catalysts in particular, there is a need for improvement. One area that needs improvement is catalyst activity. While many complexes provide high activity, further improvement is desirable. Improvements in activity minimize the amount of complex needed. When a catalyst is selected to improve a certain polymer property, the activity is often sacrificed. Another area for improvement is long-chain branching. Long-chain branching imparts desirable rheological properties to the polyethylene. These rheological properties are desirable for many applications, such as blow molding, and processes that can provide higher levels of long-chain branching are needed. There are different types of known polymerization processes and the choice of the process can influence the properties of the polyethylene. A slurry process with high activity that can also provide polymers with high long-chain branching would be valuable.

SUMMARY OF THE INVENTION

The invention is a low-temperature slurry process for polymerizing ethylene in the presence of a $C_3$-$C_{10}$ α-olefin and a supported bridged bis-indeno[2,1-b]indolyl zirconium complex. The process uses a highly active catalyst and provides polyethylene with a high level of long-chain branching, as indicated by a viscosity enhancement factor (VEF) of greater than 7. The inventive slurry process provides an activity ratio as defined herein greater than 4. The combination of attributes—high activity, and a high level of long-chain branching—strikes an uncommon but valuable balance, and it requires judicious selection of process conditions and the indenoindolyl zirconium complex.

DETAILED DESCRIPTION OF THE INVENTION

The invention is a slurry process for polymerizing ethylene in the presence of a $C_3$-$C_{10}$ α-olefin. Suitable $C_3$-$C_{10}$ α-olefins include, for example, propylene, 1-butene, 1-hexene, 1-octene, and mixtures thereof. Preferred $C_3$-$C_{10}$ α-olefins are 1-butene, 1-hexene, and 1-octene. The polymerization is performed at a temperature within the range of 40° C. to 90° C., more preferably from 50° C. to 85° C.

The slurry polymerization is performed in the presence of a catalyst comprising an activator and a supported complex. Complexes useful for process of the invention are bridged bis-indeno[2,1-b]indolyl zirconium complexes. Not all complexes of this type are suitable, however. Suitable complexes have the structure:

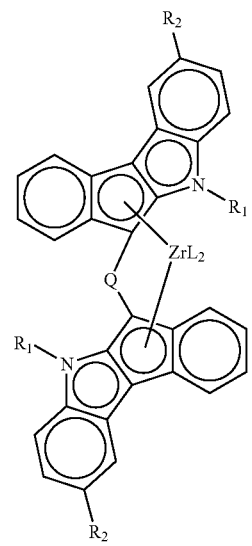

in which each $R_1$ is independently selected from the group consisting of $C_1$-$C_6$ n-alkyl; each $R_2$ is independently selected from the group consisting of H, F, and $C_1$-$C_{10}$ hydrocarbyl; Q is selected from the group consisting of methylene and dimethylsilyl; and each L is independently selected from the group consisting of halide, alkoxy, aryloxy, siloxy, alkylamino, and $C_1$-$C_{30}$ hydrocarbyl.

As those skilled in the art will appreciate, the complex shown above might be prepared as a single stereoisomer or as a mixture of stereoisomers. Throughout this patent application, a given structure is meant to encompass all possible stereoisomers of that complex, alone or in combination, and no structure is intended to be limited to any one particular stereoisomer.

Preferably, $R_1$ is methyl. Preferably, each L is Cl. More preferably, the complex has a structure selected from the group consisting of:

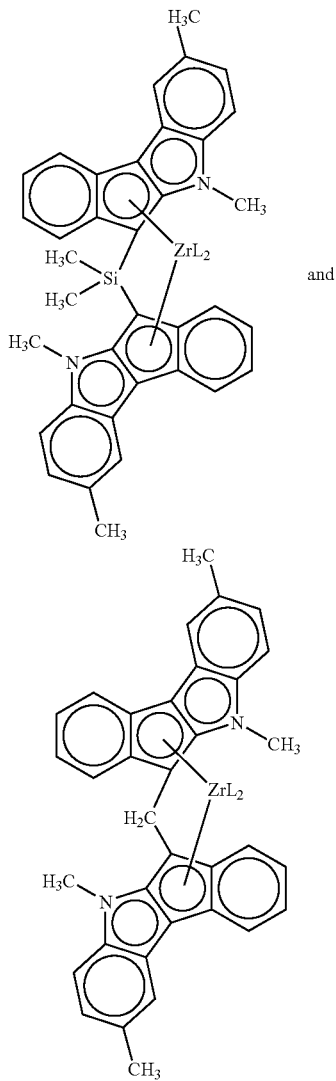

and wherein each L is independently selected from the group consisting of halide, alkoxy, aryloxy, siloxy, alkylamino, and $C_1$-$C_{30}$ hydrocarbyl.

Indeno[2,1-b]indolyl ligands are conveniently generated by deprotonating an indeno[2,1-b]indole compound using a potent base. Suitable indeno[2,1-b]indolyl ligands and ways to name, synthesize, and incorporate them into a bridged zirconium complex have been described in considerable detail elsewhere; see, for example, U.S. Pat. Nos. 6,232,260, 6,908,972 and 6,559,251, the teachings of which are incorporated herein by reference, and the references cited therein.

Example 3 of U.S. Pat. No. 6,908,972 illustrates a particularly useful way to prepare dimethylsilyl-bridged complexes suitable for use in the inventive process. Usually, the indeno [2,1-b]indole precursor having the desired substituents is prepared by reacting the appropriate 2-indanone and arylhydrazine precursors. The indole nitrogen can then be alkylated. Deprotonation followed by reaction with dichlorodimethylsilane conveniently attaches silicon at the indenyl methylene. Reaction of the monochlorosilane with a cyclopentadienyl or indenoindolyl anion provides the desired bridged ligand precursor. Double deprotonation and combination of the resulting dianion with a zirconium source affords the ultimate target, a dimethylsilyl-bridged indeno[2,1-b]indolyl zirconium complex. Methylene-bridged complexes can be prepared similarly, with the methylene bridge conveniently introduced as shown in U.S. Pat. No. 7,196,147 at column 6.

An activator is used in the polymerization. The activator helps to ionize the zirconium complex and activate the catalyst. Suitable activators are well known in the art. Examples include alumoxanes (methyl alumoxane (MAO), PMAO, ethyl alumoxane, diisobutyl alumoxane), alkylaluminum compounds (triethylaluminum, diethylaluminum chloride, trimethylaluminum, triisobutyl-aluminum), and the like. Suitable activators include salts that contain non-nucleophilic anions. These compounds generally consist of bulky ligands attached to boron or aluminum. Examples include lithium tetrakis(pentafluoro-phenyl)borate, lithium tetrakis(pentafluorophenyl)aluminate, anilinium tetrakis-(pentafluorophenyl)borate, trityl tetrakis(pentafluorophenyl)borate, and the like. Suitable activators also include organoboranes, which include boron and one or more alkyl, aryl, or aralkyl groups. Suitable activators include substituted and unsubstituted trialkyl and triarylboranes such as tris(pentafluorophenyl)borane, triphenylborane, tri-n-octylborane, and the like. These and other suitable boron-containing activators are described in U.S. Pat. Nos. 5,153,157, 5,198,401, and 5,241,025, the teachings of which are incorporated herein by reference. Suitable activators also include aluminoboronates— reaction products of alkyl aluminum compounds and organoboronic acids—as described in U.S. Pat. Nos. 5,414,180 and 5,648,440, the teachings of which are incorporated herein by reference. Alumoxane activators, such as MAO, are preferred.

The optimum amount of activator needed relative to the amount of zirconium complex depends on many factors, including the nature of the complex and activator, the desired reaction rate, the kind of polyolefin product, the reaction conditions, and other factors. Generally, however, when the activator is an alumoxane or an alkyl aluminum compound, the amount used will be within the range of about 0.01 to about 5000 moles, preferably from about 10 to about 500 moles, and more preferably from about 10 to about 200 moles, of aluminum per mole of zirconium. When the activator is an organoborane or an ionic borate or aluminate, the amount used will be within the range of about 0.01 to about 5000 moles, preferably from about 0.1 to about 10 moles, of activator per mole of zirconium.

The catalyst comprises a supported zirconium complex. The support is preferably a porous material such as inorganic oxides and chlorides, and organic polymer resins. Preferred inorganic oxides include oxides of Group 2, 3, 4, 5, 13, or 14 elements. Preferred supports include silicas, aluminas, silica-aluminas, magnesias, titanias, zirconias, magnesium chloride, and crosslinked polystyrene. Most preferred is silica. The silica is preferably treated thermally, chemically, or both prior to use to reduce the concentration of surface hydroxyl groups. Thermal treatment consists of heating (or "calcining") the silica in a dry atmosphere at elevated temperature, preferably greater than about 100° C., and more preferably from about 150 to about 600° C., prior to use. A variety of different chemical treatments can be used, including reaction with organo-aluminum, -magnesium, -silicon, or -boron compounds. See, for example, the techniques described in U.S. Pat. No. 6,211,311, the teachings of which are incorporated herein by reference. The amount of complex added is preferably from 0.01 to 0.5 mmol per gram of support.

In one suitable catalyst preparation method, a solution of the complex is combined with the support. The mixture is stirred in an inert atmosphere at a temperature within the range of 0° C. to 120° C., more preferably from 20° C. to 40° C. The optimum stirring time will vary somewhat, depending upon the amounts of solvent and support, but it should be long enough to ensure good mixing. Preferably, the stirring time is from 2 to 60 minutes. Stirring longer than 60 minutes should not decrease activity, but it is unnecessary. Stirring 30 minutes at room temperature is convenient and gives good results. If a large amount of solvent is used, the mixture is a slurry and it is convenient to remove some of the solvent to prepare a free-flowing solid. This can be done at room temperature by applying a vacuum. Alternatively, an incipient wetness technique can be used in which a small amount of solvent is used to dissolve the complex and the solution is added to the support material. The mixture remains a free-flowing solid without solvent removal. The mixture can be used as is or residual solvent may be removed.

Different methods for addition of the activator and for combining the complex with the support may be used. In one suitable method, the activator is premixed with the support and the complex is added to the mixture of support and activator. Optionally, the activator is combined with the complex and the mixture of activator and complex is added to the support. Alternatively, a portion of the activator is combined with the support and a mixture of the complex and the remaining amount of the activator is added to the support.

The process uses a highly active catalyst. A convenient measure of activity is the amount of polyethylene formed per hour per gram of zirconium used. Because factors such as temperature or time can influence the measured activity, it is convenient to compare measured activities with those obtained by using a known complex under similar polymerization conditions. One such readily available complex is bis(cyclopentadienyl)zirconium dichloride.

As defined herein, "activity ratio" means the value of $A_1/A_2$, where $A_1$ is the activity (grams of polymer per gram of Zr per hour) of a complex of interest that is supported and activated as described in Example 1 and is then used for a slurry polymerization in the presence of 1-butene and hydrogen as described in Example 1; and $A_2$ is the activity of bis(cyclopentadienyl)zirconium dichloride that is supported and activated as described in Example 1 and is then used for a slurry polymerization as described in Example 1 except that 1-butene and hydrogen are omitted from the slurry polymerization.

Thus, the baseline experiment with $Cp_2ZrCl_2$ is an ethylene homopolymerization performed in the absence of hydrogen. Catalysts useful in the slurry process of the invention have an activity ratio as defined herein greater than 4, preferably greater than 5.

The process produces polyethylene with high levels of long-chain branching. As described in Macromolecules 39 (2006) 1474, rheological measurements can be used to estimate the amount of long-chain branching. At low shear rates, the viscosity of polyethylene with long-chain branching is higher than the viscosity of linear polyethylene of equivalent molecular weight. We can use a viscosity enhancement factor (VEF) as an indication of long-chain branching. The viscosity enhancement factor can be determined from the ratio of the measured viscosity at a fixed temperature and frequency to the viscosity predicted for linear polyethylene of equivalent molecular weight. Preferably, the temperature used is 190° C. and the frequency is 0.025 rad/s. For the purpose of this application, by "viscosity enhancement factor" we mean the ratio of the measured viscosity at 190° C. and a frequency of 0.025 rad/s to the viscosity predicted for linear polyethylene of equivalent molecular weight. The viscosities of more than forty linear polyethylene samples of varying weight-average molecular weight were measured to develop the relationship between $M_w$ and viscosity at 0.025 rad/s. The viscosity prediction for linear polyethylene=$(2.1 \times 10^{-14})(M_w^{3.66})$. A linear polyethylene will have a viscosity enhancement factor of about 1, while a sample of polyethylene known to have substantial long-chain branching had a viscosity enhancement factor of 15. By "high long-chain branching," we mean a viscosity enhancement factor of greater than 7. Such polyethylenes are mostly linear, but the rheological effect of the long-chain branching is relatively large. For more details about how to measure and compute VEF, see copending application Ser. No. 11/897,438, filed Aug. 29, 2007, the teachings of which are incorporated herein by reference.

Preferably, the slurry process produces polyethylene with good incorporation of the α-olefin. The amount of α-olefin incorporation will depend upon the particular α-olefin and the amount added to the polymerization. The level of α-olefin incorporation can be easily measured by FT-IR spectroscopy. Each molecule of α-olefin incorporated gives one tertiary carbon atom. "Good incorporation" of the α-olefin is indicated by a polyethylene density value that drops steadily upon increasing the content of α-olefin in the reaction mixture. More quantitatively, this generally means that when 63 mmoles of 1-butene per mole of ethylene is introduced into the liquid phase, the resulting polyethylene has more than 5 tertiary carbons per 1000 carbons.

Preferably, the inventive slurry process can provide polyethylene having a weight-average molecular weight greater than 200,000. Too often, a process is unable to provide polyethylenes with high enough molecular weight (or low enough melt index), and this limits its usefulness. The inventive process can provide the desirable high molecular weight.

Also important is the ability to control molecular weight by adding hydrogen into the process. Preferably, the inventive slurry process has some hydrogen sensitivity and even low levels of hydrogen reduce the molecular weight. Increased levels of hydrogen further reduce the molecular weight. The hydrogen sensitivity can be judged by comparing polymerizations with and without added hydrogen. By "hydrogen sensitivity," we mean that introduction of 0.82 mmoles of hydrogen per 1 mole of ethylene into the liquid phase reduces the weight-average molecular weight by at least 30%.

Complex concentrations used for the olefin polymerization depend on many factors. Preferably, however, the concentration ranges from about 0.01 micromoles zirconium per liter to about 100 micromoles per liter. Olefin partial pressures normally range from about 0.1 MPa to about 350 MPa. More preferred is the range from about 0.1 MPa to about 7 MPa. Polymerization times depend on the type of process, the complex concentration, and other factors. Generally, polymerizations are complete within several seconds to several hours.

The following examples merely illustrate the invention. Those skilled in the art will recognize many variations that are within the spirit of the invention and scope of the claims.

EXAMPLE 1 n-Butyllithium (12.3 mL, 2.5 M in hexanes, 30.8 mmol) is added to a slurry of 2,5-dimethylindeno[2,1-b]indole (6.54 g, 28.0 mmol) in diethyl ether (100 mL). The solids dissolve, the solution darkens and the mixture is maintained at room temperature overnight. A solution of dichlorodimethylsilane (1.7 mL, 14.0 mmol) in diethyl ether (8 mL) is slowly added at 23° C. A precipitate forms. The mixture is allowed to stand overnight and is filtered through Celite. The volatiles are removed from the filtrate under vacuum. The residue is slurried in hexanes (50 mL) and filtered to give a solid (4.54 g, 31.0%).

The solid (4.54 g, 8.69 mmol) is dissolved in diethyl ether (100 mL), and n-butyllithium (7.7 mL, 2.5 M in hexanes, 19.3 mmol) is added at 23° C. to afford a clear red solution. The solution is maintained overnight and added to a solution of zirconium tetrachloride (2.02 g, 8.67 mmol) in methylene chloride (150 mL) and diethyl ether (50 mL). A dark orange solid forms. The mixture is filtered the next day, and the solid extracted with methylene chloride (100 mL) and washed with additional methylene chloride (20 mL). The filtrate is concentrated to about 80 mL, and a solid precipitates. A total yield of 0.15 g of complex 1 is isolated.

Support and Activation of Complex 1: Methylalumoxane (2.2 mL of 4.21 M solution in toluene, available from Albemarle Corporation) is added at room temperature to a slurry of 0.75 g of silica (G3, available from Fuji Silysia Chemical Ltd., calcined at 250° C. for 12 hours) in 4 mL of anhydrous toluene. The resulting stirred slurry is heated at 80° C. for two hours and cooled to ambient temperature. A 0.0926 mmole sample of dry complex 1 (Al/Zr=100) is added to the slurry and stirred for 2 hours at ambient temperature. An aliquot of this catalyst slurry is used while fresh (1 to 3 days) in polymerization tests.

Slurry Polymerization with Supported Complex 1: Isobutane (1 L), 1-butene (5 mL) and 1M triisobutylaluminum solution in hexanes (1 mL) is added to a dry, nitrogen-purged stainless-steel stirred and jacketed autoclave reactor. The reactor is heated to 70° C. and pressurized to 1.7 MPa with ethylene. The polymerization reaction is started by injecting an aliquot of catalyst sample. The temperature is maintained at 70° C. throughout the test. The ethylene is supplied on demand to maintain the reactor pressure of 1.7 MPa. The polymerization is terminated by venting the autoclave after consumption of approximately 20 g of ethylene. The polyethylene sample is dried and tested.

The viscosity enhancement factor (VEF) is determined to be 10.0. By GPC, the polyethylene has a weight-average molecular weight ($M_w$) of 273,000 and a $M_w/M_n$ of 3.13. Branching is determined by FT-IR spectroscopy to be 8.70 tertiary carbons per 1000 carbons. The activity ratio, computed as discussed hereinabove, is 7.16. When the slurry polymerization is repeated using hydrogen added from a 7-mL vessel at 4.1 MPa to effect a pressure drop of 0.7 MPa (calculated to be 0.82 mmole hydrogen per mole of ethylene), the $M_w$ is reduced by 64%.

EXAMPLE 2

Complex 2 is prepared in similar fashion as complex 1, except that the methylene bridge is introduced as described in U.S. Pat. No. 7,196,147 at column 6, step c.

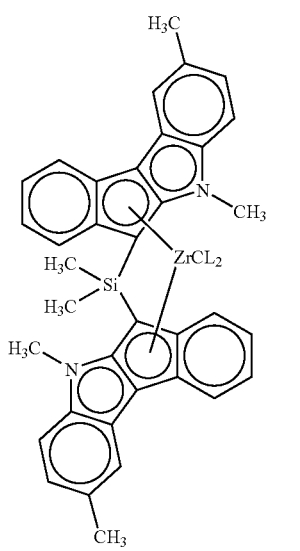

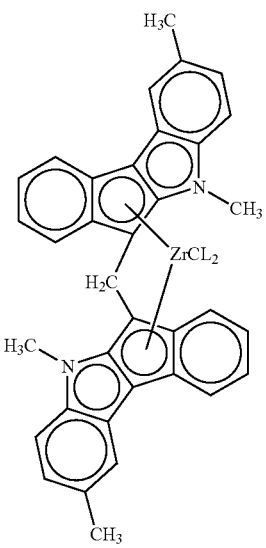

The complex is supported and used in a slurry polymerization in similar fashion as in Example 1. The results are reported in Table 1.

COMPARATIVE EXAMPLES 3-24

Complexes 3, 4, and 7-23 are prepared in similar fashion as complexes 1 and 2. Complexes 5 and 6 are purchased from Sigma-Aldrich, Inc. Each complex is supported and used in a slurry polymerization in similar fashion as in Example 1. The results are reported in Table 1.

3
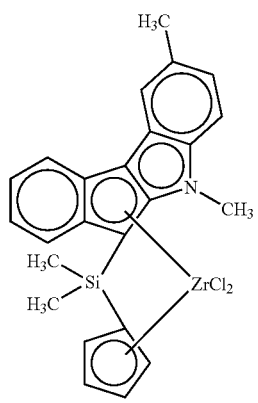
4
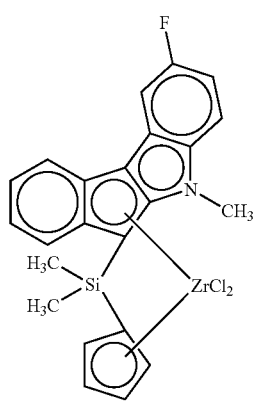
5
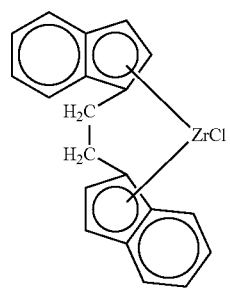
6
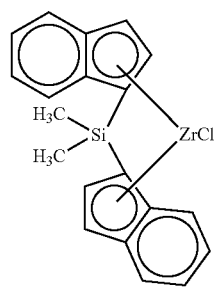
-continued
7
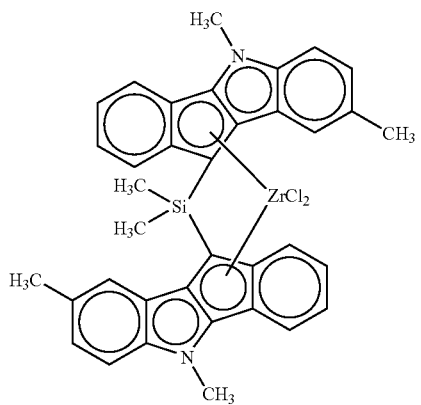
8
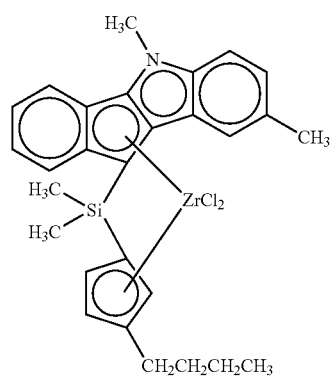
9
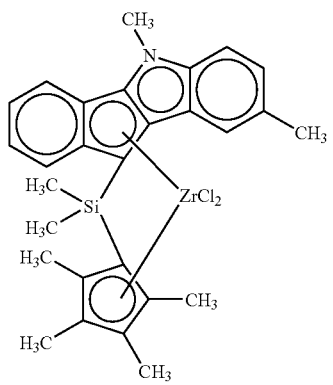
10
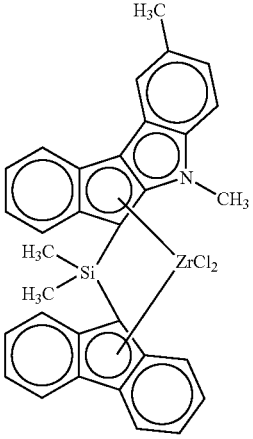

-continued
11
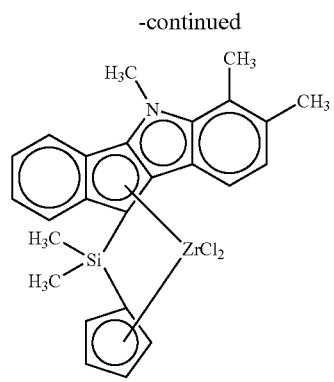
12
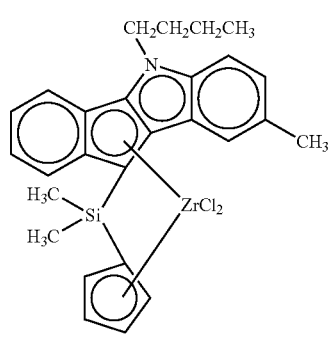
13
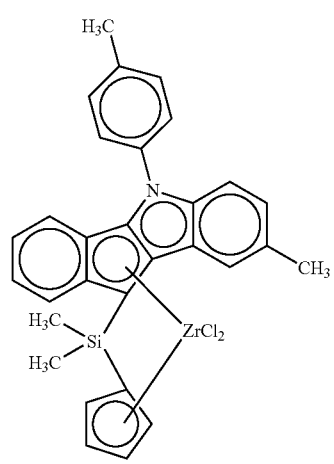
14
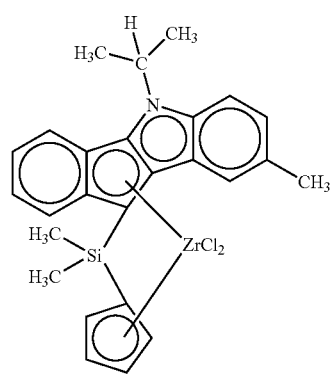
-continued
15
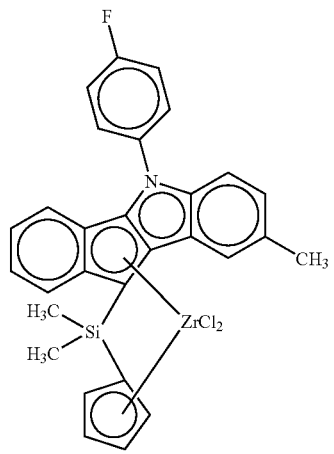
16
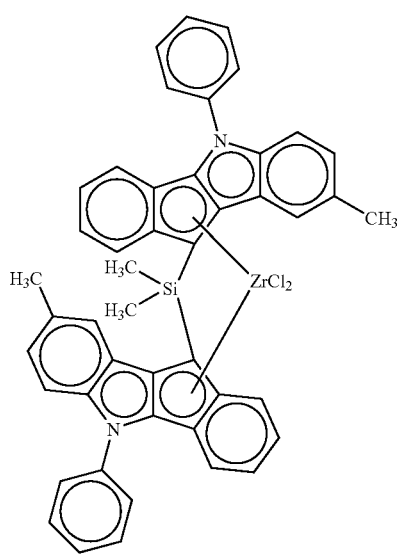
17
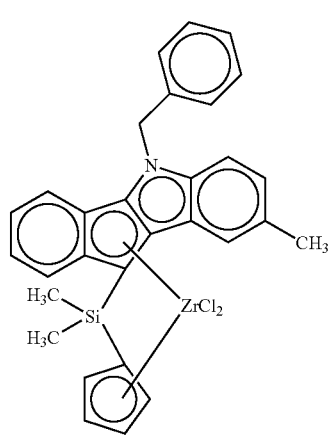

-continued

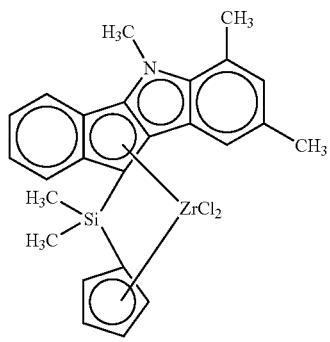
18

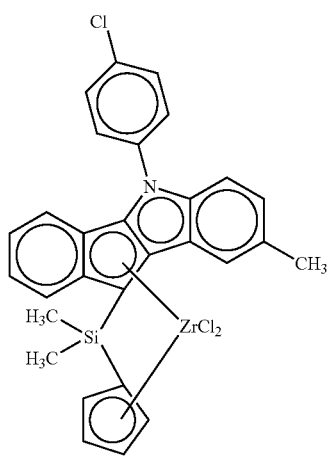
19

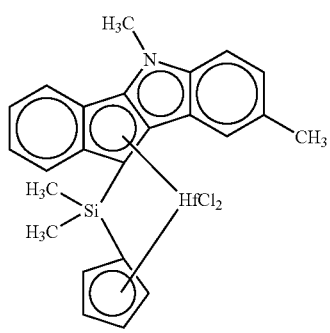
20

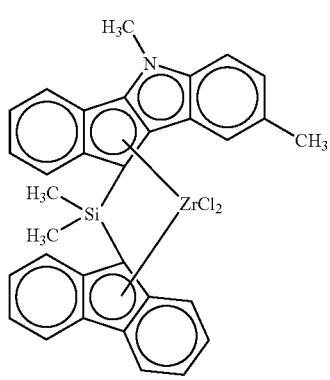
21

-continued

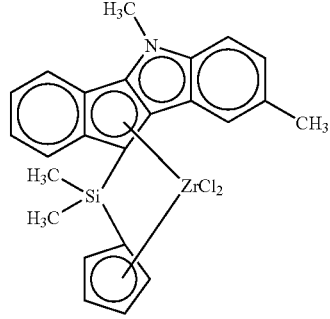
22

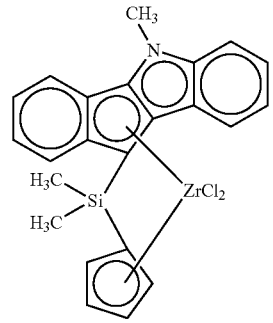
23

TABLE 1

Polymerizations

| Example | VEF | $M_w$ | $M_w$ reduction with $H_2$ | $M_w/M_n$ | Tertiary C/ 1000 C | Activity Ratio |
|---|---|---|---|---|---|---|
| 1 | 10.0 | 273,000 | 64% | 3.13 | 8.70 | 7.16 |
| 2 | 10.7 | 250,000 | 52% | 4.12 | 20.7 | 5.51 |
| C3 | 4.40 | 198,000 | 81% | 3.21 | 8.47 | 3.74 |
| C4 | 4.65 | 236,000 | 83% | 3.98 | 8.53 | 3.45 |
| C5 | 6.04 | 178,000 | 68% | 4.82 | 11.93 | 5.54 |
| C6 | 4.61 | 257,000 | 66% | 5.10 | 12.2 | 6.87 |
| C7 | 1.94 | 1,000,000 | 86% | 4.26 | 5.77 | 6.02 |
| C8 | 1.60 | 289,000 | 75% | 3.96 | 7.27 | 4.98 |
| C9 | 5.63 | 372,000 | 77% | 2.29 | 4.97 | 2.36 |
| C10 | 5.40 | 344,000 | 6% | 2.65 | 5.53 | 2.11 |
| C11 | 1.53 | 522,000 | 90% | 4.69 | 7.50 | 1.47 |
| C12 | 0.99 | 415,000 | 86% | 3.17 | 8.13 | 1.08 |
| C13 | 3.61 | 507,000 | 64% | 5.57 | 6.10 | 1.63 |
| C14 | 3.60 | 316,000 | 86% | 5.85 | 7.17 | 1.38 |
| C15 | 2.96 | 552,000 | 90% | 5.16 | 6.68 | 1.04 |
| C16 | 2.71 | 702,000 | 68% | 2.41 | 6.03 | 4.84 |
| C17 | 2.67 | 397,000 | 85% | 3.40 | 5.40 | 3.01 |
| C18 | 2.34 | 784,000 | 94% | 4.97 | 5.45 | 3.49 |
| C19 | 2.27 | 502,000 | 89% | 3.65 | 5.88 | 2.32 |
| C20 | 2.13 | 347,000 | 39% | 2.92 | 9.65 | 0.10 |
| C21 | 1.44 | 753,000 | 43% | 2.31 | 5.35 | 1.88 |
| C22 | 2.99 | 517,000 | 90% | 4.13 | 6.33 | 2.69 |
| C23 | 0.88 | 543,000 | 89% | 3.73 | 5.47 | 1.61 |

As can be seen from Table 1, the claimed slurry process (Examples 1 and 2) produces polyethylene with both high long-chain branching, as evidenced by a VEF greater than 7 and high catalyst activity as evidenced by an activity ratio as defined hereinabove greater than 4.

Comparative Examples 3-23 demonstrate that this balance of desirable properties is unexpected. Very similar complexes fail to provide both attributes. In particular, most bridged indenoindolyl complexes provide lower levels of long-chain branching as indicated by a viscosity enhancement factor <7.

Most bridged indenoindolyl complexes provide an activity ratio less than 4. The combination of these two desirable properties is unexpected.

The preceding examples are meant only as illustrations. The following claims define the invention.

We claim:

1. A slurry process which comprises polymerizing ethylene at a temperature within the range of about 40° C. to about 90° C. in the presence of a catalyst comprising an activator and a supported complex to produce polyethylene with high long-chain branching as indicated by a viscosity enhancement factor of greater than 7, wherein the catalyst has an activity ratio as defined herein greater than 4, and wherein the complex has the structure:

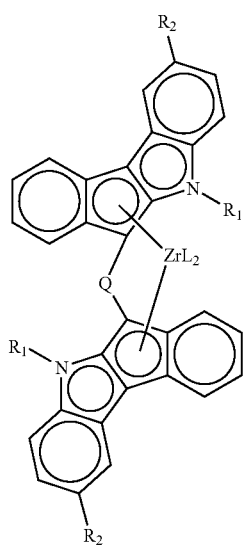

wherein each $R_1$ is independently selected from the group consisting of $C_1$-$C_6$ n-alkyl; each $R_2$ is independently selected from the group consisting of H, F, and $C_1$-$C_{10}$ hydrocarbyl; Q is selected from the group consisting of methylene and dimethylsilyl; and each L is independently selected from the group consisting of halide, alkoxy, aryloxy, siloxy, alkylamino, and $C_1$-$C_{30}$ hydrocarbyl.

2. The process of claim 1 wherein $R_1$ is methyl.

3. The process of claim 1 wherein each L is Cl.

4. The process of claim 1 further comprising polymerizing ethylene in the presence of a $C_3$-$C_{10}$ α-olefin selected from the group consisting of propylene, 1-butene, 1-hexene, 1-octene, and combinations thereof.

5. The process of claim 4 wherein the $C_3$-$C_{10}$ α-olefin is selected from the group consisting of 1-butene, 1-hexene, and 1-octene.

6. The process of claim 1 wherein the polyethylene has a molecular weight distribution ($M_w/M_n$) of less than 4.5.

7. The process of claim 1 wherein the complex has the structure:

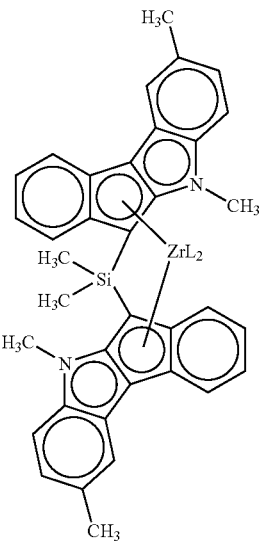

wherein each L is independently selected from the group consisting of halide, alkoxy, aryloxy, siloxy, alkylamino, and $C_1$-$C_{30}$ hydrocarbyl.

8. The process of claim 1 wherein the complex has the structure:

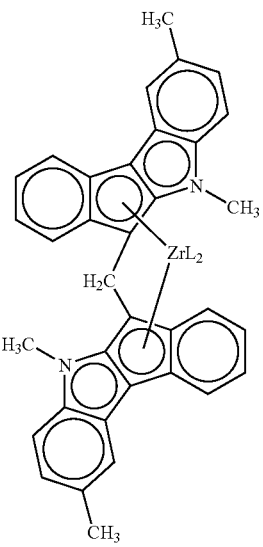

wherein each L is independently selected from the group consisting of halide, alkoxy, aryloxy, siloxy, alkylamino, and $C_1$-$C_{30}$ hydrocarbyl.

9. The process of claim 1 wherein the activator is selected from the group consisting of alumoxanes, alkylaluminum compounds, organoboranes, ionic borates, ionic aluminates, aluminoboronates, and combinations thereof.

10. The process of claim 9 wherein the activator is methylalumoxane.

* * * * *